United States Patent [19]

Swanson

[11] Patent Number: 4,622,890

[45] Date of Patent: Nov. 18, 1986

[54] DOUGH LAPPER

[75] Inventor: Peter E. Swanson, Duluth, Minn.

[73] Assignee: The Pillsbury Company, Minneapolis, Minn.

[21] Appl. No.: 771,549

[22] Filed: Sep. 3, 1985

[51] Int. Cl.[4] .............................................. A21C 9/04
[52] U.S. Cl. ................................... 99/450.2; 198/603
[58] Field of Search ................. 99/450.1, 450.2, 450.3, 99/450.4, 450.5, 450.6, 485; 366/69, 70; 425/320, 321; 426/502; 198/603

[56] References Cited

U.S. PATENT DOCUMENTS

| | | | |
|---|---|---|---|
| 1,965,779 | 7/1934 | Mercier | 425/321 |
| 2,130,097 | 9/1938 | Loose | 425/320 |
| 2,478,075 | 8/1949 | Baker | 99/450.2 |
| 2,627,822 | 2/1953 | Hubbard | 425/396 |
| 3,013,298 | 12/1961 | Engel | 198/603 |
| 3,698,309 | 10/1972 | Steels | 99/450.1 |
| 3,804,637 | 4/1974 | Rejsa | 99/450.1 |
| 3,851,088 | 11/1974 | Albrecht | 99/450.1 |
| 4,196,527 | 4/1980 | Escande | 198/603 |
| 4,441,408 | 4/1984 | Costa | 99/450.2 |

Primary Examiner—Robert W. Jenkins
Attorney, Agent, or Firm—Robert J. Lewis

[57] ABSTRACT

A dough lapper is provided which includes four conveyers, each having a separate conveyer belt. The conveyers include an infeed conveyer which feeds a second conveyer which in turn feeds a third conveyer with the first, second and third conveyers being in superposed relation and in longitudinal alignment. The fourth conveyer is positioned generally normal to the first three conveyers and is positioned below the third conveyer for receiving dough therefrom in a lapped condition. The third conveyer reciprocates back and fourth over the fourth conveyer lapping the dough onto the fourth conveyer. The first three conveyers have separate conveyer belts and are operated by drive means in association with one another to provide gentle handling of the dough and independent but coordinated operation of the three conveyers.

7 Claims, 5 Drawing Figures

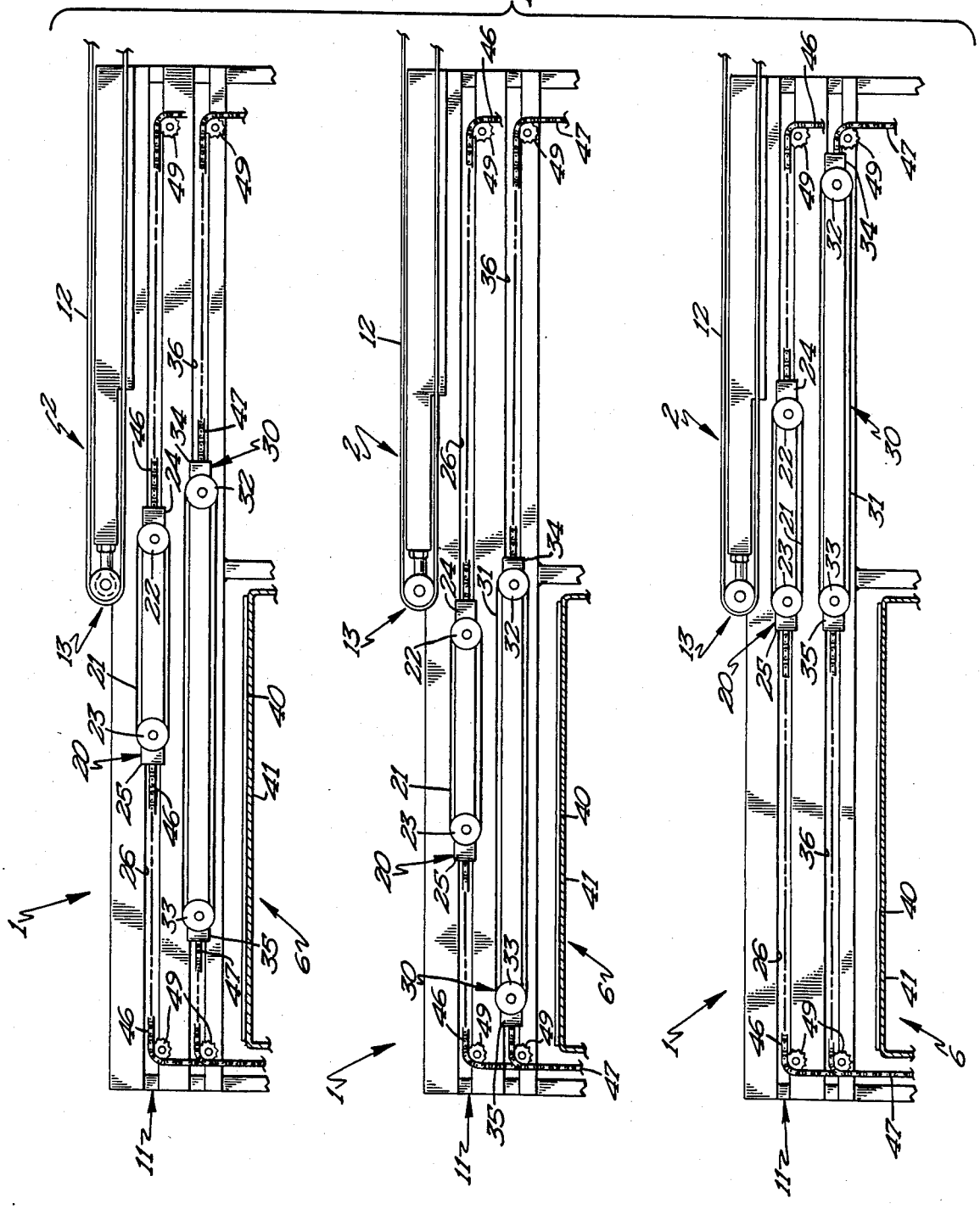

4,622,890

DOUGH LAPPER

BACKGROUND OF THE INVENTION

In forming various dough products, for example, danish, it is highly desirable to have a laminated texture in the final baked or cooked product. This has traditionally been achieved by forming alternating layers of fat and dough. This laminating can be done by hand or machine and in continuous operations of high volume output it is desirable to do it by machine.

Numerous laminating machines have been devised in the past but have met with shortcomings such as: complicated structure; lack of adjustability; unsanitary because of enclosures; excessive reciprocating conveyers; longer than necessary belts, etc. For example, U.S. Pat. No. 2,478,075 discloses a device for forming continuous laminated biscuit dough which uses three conveyers with two belts with all three conveyers moving in a reciprocating fashion.

Because doughs used in laminated products can be very fragile, it is very important to have a lapping machine which gently handles the dough and maintains a substantially constant or slightly increasing dough speed from the infeed conveyer of the laminator to the out feed conveyer of the laminator. The general concept of an intermediate conveyer to act as an accumulator, i.e. take up dough during the backstroke and give up dough during the forward stroke is taught by the above-cited patent.

Many other lappers have been devised but have had the above-listed problems, particularly their complicated structure and lack of adjustability.

The present invention provides a simplified, effective, gentle and adjustable dough lapper which overcomes the problems attendant with prior art lappers. The prevent invention also provides a lapper which is easily adjustable for different throughput rates of dough web.

DETAILED DESCRIPTION

FIG. 5 is a schematic illustration of the reciprocating conveyers in various positions of extension and retraction.

Figure 1:
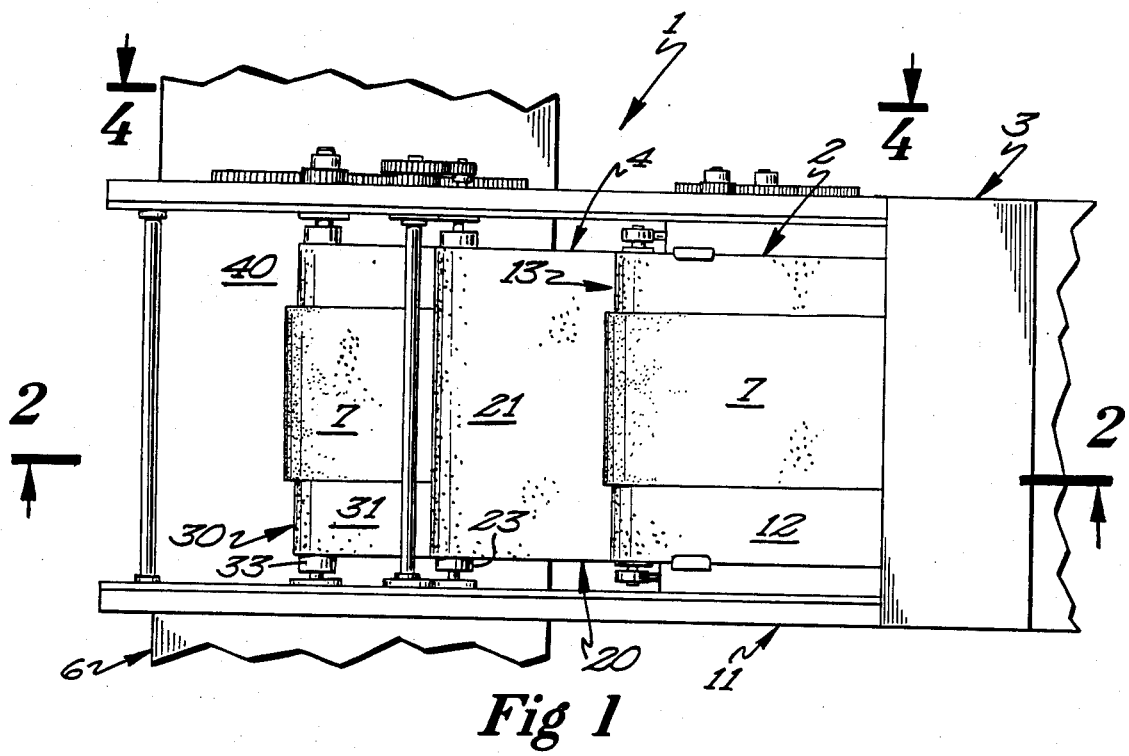
FIG. 1 is a plan view of the dough lapping apparatus.
Figure 4:
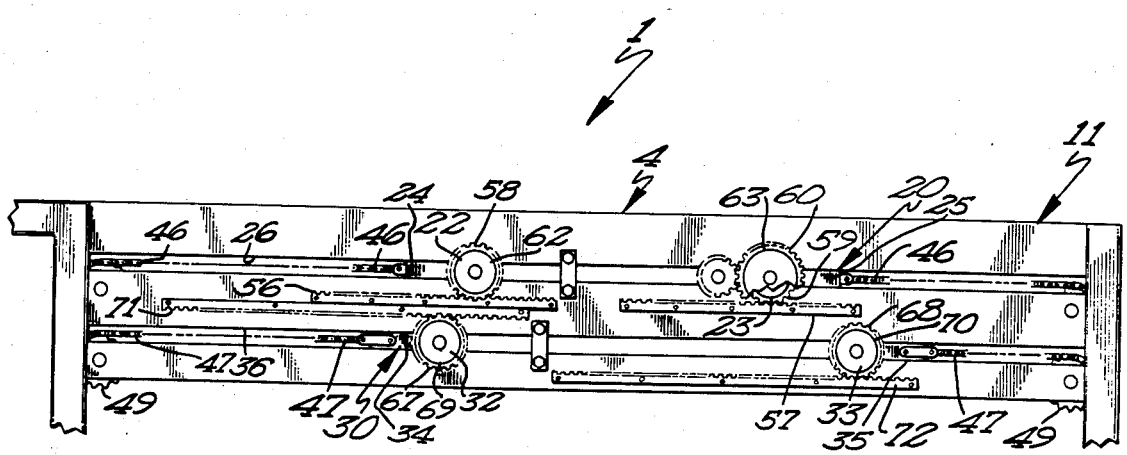
FIG. 4 is a fragmentary side view of one side of the drive means for certain of the conveyor belts.

The reference number 1 designates generally a dough lapping apparatus which is operable for taking a preformed web of dough and laying the web of dough into a plurality of layers, one on top of the other, in order to form a laminated or lapped dough. The apparatus 1 generally includes an infeed conveyer means 2 which is operably connected to drive means 3 for driving the conveyer means 2 at a predetermined rate. Second conveying means 4 are positioned in juxtaposed relationship to the infeed conveyer 2 and is operable for moving relative to the conveyer means 2 in reciprocating motion to move a dough web back and forth and lay same in lapped relation onto itself. The conveying means 4 is driven by suitable drive means 5 which effects motion of the conveying means 4 both in moving its conveyer belts and in its reciprocating motion. An outfeed conveyer means 6 is positioned, preferably generally normal to the conveying means 2 and 4 and receives the dough web 7 thereon and transports the dough web in a lapped condition to further processing means (not shown) as is known in the art as for example sheeting apparatus, cutters, etc. Drive means (not shown) are operably connected the conveying means 6 to drive same at a predetermined rate as is known in the art.

The apparatus 1 includes a frame or other support structure 11 which has mounted thereon the conveying means 2. The conveying means 2 can be any suitable conveyer such as a belt conveyer as is known in the art and includes a belt 12 which is continuous. Conveying means 2 has a discharge end 13 which preferably is nonreciprocating, i.e. relative to the ground it does not move. What is meant by the end 13 not moving is that the belt 12 and its supporting roller are moving but the conveyer bed which can be a belt supporting or non supporting type is not moving such that the end, the point of discharge of the dough is not reciprocating relative to the ground. The belt 12 passes over its support structure or conveyer bed to its drive means 3 which includes a drive motor 14 which is in driving engagement with a roller 15. The belt passes around idler pulleys 16 and the roller 15 to be driven by the motor 14. Such conveyers and drive means are well known in the industry and need not be described in detail herein.

The motor 14, roller 15 and idlers 16 are suitably mounted on the frame 11 and can be made adjustable if desired. Preferably the motor 14 is connected to control means (not shown), as are known in the art to vary the speed of the motor and hence the speed of the belt 12.

The conveying means 4 includes a plurality of conveyers which preferably are positioned beneath and in superposed relation with the conveyer 2, move in planes generally parallel to the plane of the top run of the belt 12 reciprocate generally in line with the direction of movement of the belt 12 and are in logitudinal alignment with the conveyer 2 to receive the dough web 7 therefrom. In a preferred embodiment of the present invention the conveying means 4 includes 2 reciprocating conveyer means 20 and 30 which as shown are positioned below and in logitudinal alignment with the conveying means 2.

The intermediate conveying means 20 is mounted on the frame 11 for reciprocating movement relative to the conveyor 2. The conveyer 20 includes mounting means which allow free movement of the conveyer 20 within the frame 11. The conveyer means 20 also includes a belt 21 which is supported between rollers 22 and 23. The rollers 22 and 23 are mounted on slides 24 and 25 respectively to form a conveyer bed. The slides 24 and 25 are reciprocably mounted on tracks 26 which are suitably mounted to the frame 11.

Similar to the conveyer 20, the conveyer 30, which is part of the conveying means 4, is reciprocably mounted on the frame 11. The conveyer 30 includes a belt 31 mounted on rollers 32 and 33. The rollers 32 and 33 are mounted on slides 34 and 35, to form a conveyer bed, which in turn are reciprocably mounted on tracks 36 which are secured to the frame 11. The upper or dough supporting runs of the belts 12, 21 and 31 preferably are generally parallel.

The conveyer means 6 includes a belt 40 and a support 41 as are known in the art and need not be described in detail herein. The conveyer means 6 has a drive means which is preferably variable, independent of the speed of the conveyers 20 and 30, to allow variation of the speed of the conveyer belt 40 if desired. The support 41 can be secured to the frame 11 if desired or can be separate conveyer which can be moved into place under the lapper 1.

The drive means 5 is operably connected to the conveyer means 20 and 30 to effect both reciprocating motion thereof and movement of the belts 21 and 31. Preferably the drive means 5 is associated with the motor 14 to synchronize the movements between the conveyer 2 and the conveyer means 4 in the illustrated embodiment, which is the preferred embodiment. It should be understood, however, that the drive means 5 and the motor 14 and its associated drive means can be any suitable drive means and not necessarily that which is shown and that these drive means can be modified in order to achieve differing movements of the lapping apparatus 1.

In the illustrated embodiment the drive means 5 includes a linear motion device 44 of any suitable type as for example a cable cylinder 45 as for example Cable Cylinder made by Tol-O-Matic which provides reciprocating motion in the drive means 5 to effect the reciprocating motion of the conveyers 20 and 30. The cylinder 45 is in driving connection with conveyers 20 and 30 through chains 46 and 47 respectively with one chain 46 and one chain 47 on each side of the machine with each of the chains being connected to a respective slide 24, 25, 34 and 35. The chains 46 and 47 are mounted on idler pulleys 49 which are rotatably mounted on the frame 11. The connection between the cylinder 45 and the chains 46 and 47 is through a sprocket arrangement at 50, which sprocket arrangement is rotatably mounted on the frame 11. A chain 51 is connected to each end of the cylinder 45 and is supported by an idler 52 at one end which is rotatably mounted on the frame 11 and a sprocket 53 which is part of the sprocket arrangement 50. Movement of the cylinder 45 effects movement of the chains 46 and 47 via their connection through the sprocket arrangement 50. Reciprocating motion of the cylinder 45 effects reciprocating movement of the conveyers 20 and 30 on the frame 11. By varying the sprocket ratio of the sprocket arrangement 50, the relative movement between the conveying means 2, 20 and 30 can be adjusted or predetermined.

In order to effect movement of the belts 21 and 31 the drive means 45 through its movement of the conveyers 20 and 30 can achieve this belt movement or the movement of the belts can be separately controlled through other drive means if desired. As shown, however, the conveyer 20 has drive means connected to each of the rollers 22 and 23 to effect movement of the belt 21. Mounted on the frame 11 are racks 56 and 57. The roller 22 has a gear 58 mounted thereon and meshed with the rack 56 and the roller 23 has a gear arrangement which is comprised of a series of three spur gears 59, 60 and 61 mounted thereon with the gear 59 being meshed with the rack 57. The gear 58 and the gear arrangement 59, 60, 61 are connected to the rollers via overrunning clutches which permit selective driving rotation of the rollers 22 and 23 during extension and retraction of the conveyer 20. Upon extension the overrunning clutch 63 engages driving the roller 23, on retraction the clutch 62 drives the roller 22. Because of the difference in the gear ratios, the belt speed is different upon extension and retraction as more fully described hereinafter. A similar set of drive elements for the belt 21, as described above, preferably are mounted on the other sides of the frame 11 as well.

The rollers 32 and 33 have operably connected thereto gears 67 and 68 respectively through respective overrunning clutches 69 and 70. Mounted on the frame 11 are racks 71 and 72, each meshed with the respective gear 67 and 68. Upon extension of the conveyer 30, the clutch 70 and gear 68 drive the belt 31 and on retraction the gear 67 and clutch 69 drive the belt 31 as more fully described hereinafter. A similar set of drive elements for the belt 31, as described above, preferably are mounted on the other side of the frame 11 as well. In a preferred embodiment the drive means 3 and the drive means 5 are synchronized to one another to provide synchronized movement between the conveyer means 4 and the conveyer means 2. In the illustrated embodiment that synchronization is provided by a mechanical linkage between the two drive means. As illustrated, four shaft and sprocket arrangements are rotatably mounted on the frame 11 and include clutch shafts 76 and 77 and idler shafts 78 and 79. On the drive end the shafts 76, 78 and 79 are mounted on sprockets 81, 82 and 83, respectively. The motor 14 has a sprocket 84 mounted thereon which is connected to the sprockets 81, 82 and 83 via a chain 85. In the illustrated embodiment the sprocket 84 rotates counterclockwise as well as the sprockets 81 and 82 while the sprocket 83 would rotate clockwise. On the nondrive end of the shafts 76, 77 and 79 there are mounted sprockets 87, 88 and 89 respectively. The sprockets 87 and 89 are mounted on their respective shafts 76 and 79 via overrunning clutches 90 and 91. A chain 93 connects the sprockets 87, 88 and 89 to the cylinder 45 via a sprocket 94 through a shaft 95.

Upon extension of the conveyers 20 and 30 the clutch 90 and sprocket 87 try to drive the shafts 76 and sprocket 81 but because of the limitation of the speed of the motor 14 there is a limit on the extension speed of the conveyers 20 and 30. Upon retracting movement of the conveyers 20 and 30 the sprocket 89 and clutch 91 try to drive the shaft 79 and sprocket 83 and because the speed limitation of the motor 14 the retraction speed of the conveyers 20 and 30 is similarly limited.

In the illustrated structure the lapper can be provided with dedusters which remove dust from the belts as for example the deduster 97 is mounted on the frame 11 under the belt 12 to receive removed dust therefrom. Such dedusters are known in the art and are not described herein in detail.

The present invention is more fully understood by a description of the operation thereof. The motor 14 drives the belt 12 and as described above limits the extension and retraction speed of the conveyers 20 and 21 as well as the speed of the belts 21 and 31. However, in some instances it might be desired to have the dough accumulate, i.e. bunch up, or be slightly stretched throughout the passing through of the lapping device. However, particularly with fragile doughs, it is desired that the dough be neither bunched up nor stretched or minimally. In the described example, the dough will be neither bunched nor stretched by movement or speed differentials (some stretching may occur however by gravity when the dough is unsupported between conveyers) but if desired the drive means could be adjusted in relative speed to achieve such if it is not critical.

DESCRIPTION OF OPERATION OF PREFERRED EMBODIMENT

It will be assumed that the dough web 7 is being along the belt 12 at a feed rate of 10 feet per minute. Movement convention is + for movement in extension or to the left and — for movement in retraction or to the right, belt speed is for the top run or dough support run. Unless otherwise specified speeds are relative to the ground. On extension the conveyers 20 and 30 will move on extension at speeds of +5 feet per minute and +10 feet per minute respectively. In order to accommodate the 10 feet per minute of dough the belt 21 will need a speed of −10 feet per minute (fpm) (−15 fpm relative to the conveyer 20), i.e. to the right, while the belt 31 will need a speed of +20 fpm (+10 fpm relative to the conveyer 30). Upon retraction the conveyers 20 and 30 will move (and their respective discharge ends) to the right, at speeds of −5 fpm and −10 fpm respectively. The belt 21 will move a speed of −10 fpm (−5 fpm relative to the conveyer 20) while the belt 31 will move at a speed of 0 fpm (+10 fpm relative to the conveyer 30). This provides a ratio of speeds of the discharge ends conveyers 2, 20 and 30 of 0:1:2 in both directions and a ratio of belt speeds (relative to ground) for belts 12, 21 and 31 of +1:−1:+2 on extension and +1:−1:0 on retraction. This theoretically prevents stretching and bunching.

Figure 2:
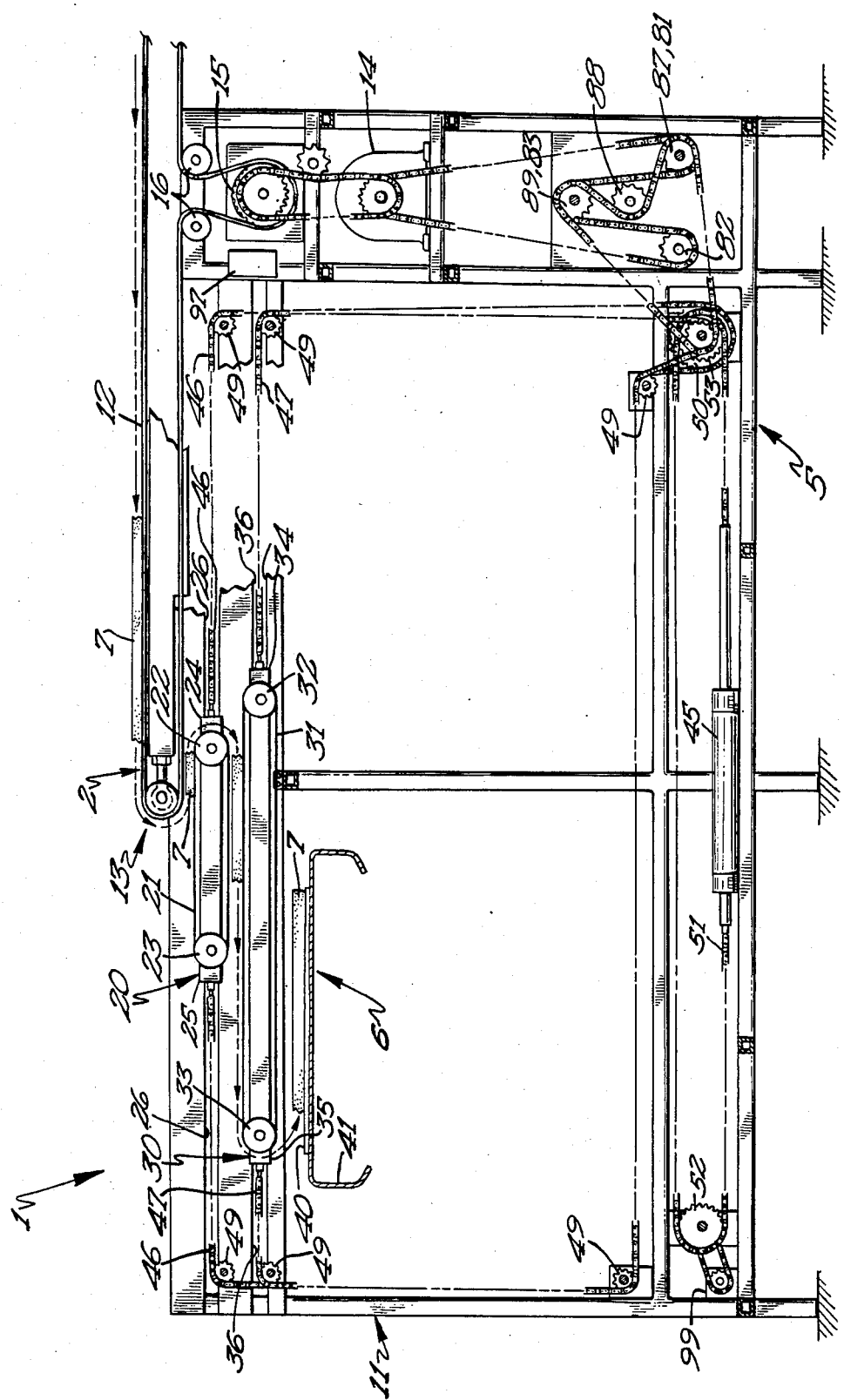
FIG. 2 is a sectional view of the lapping apparatus, taken along the line 2—2 FIG. 1.
Figure 3:
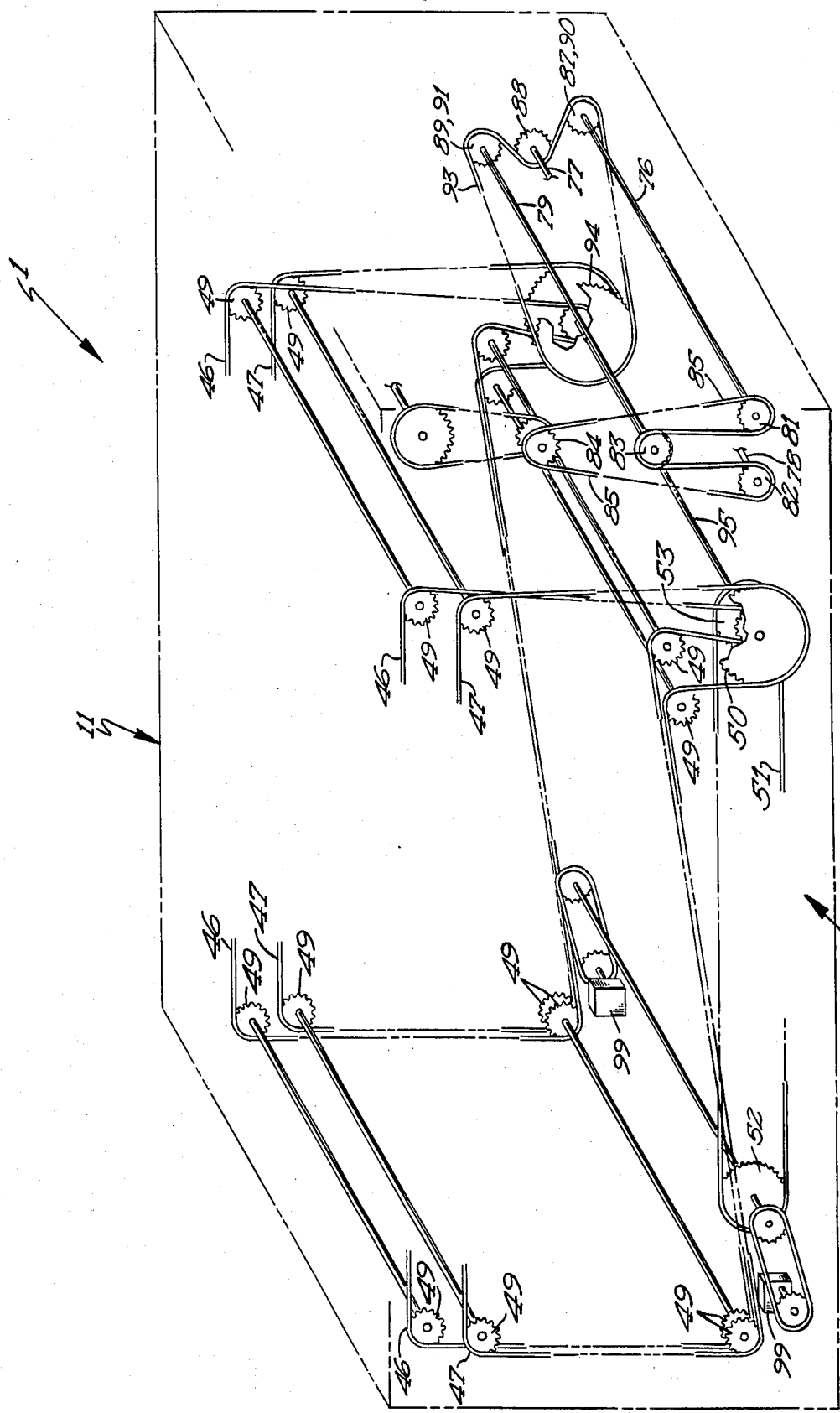
FIG. 3 is a diagrammatic perspective view of the drive means for the dough lapper.

The lapper 1 overlays the dough onto the conveyer 40 forming a V pattern which in the preferred embodiment is uniform, i.e. the angle of the leading edge of the dough web as placed on the belt 40 is at the same angular relationship to a line normal to the direction of movement of the belt 40. The angle of the leading edges can be varied by varying the speed of the belt 40 or the speed of the conveyers 2, 20 and 30. This determines the number of overlaps and hence the number of layers of dough upon subsequent processing of the dough. The dough web 7 as best seen in FIG. 2 travels in a generally S shaped curve or path with the conveyer 20 acting as the accumulator providing the give up and take up of dough to prevent bunching or stretching during movement of the conveyor 30 which provides the laying down of the dough onto the belt 40. The conveyers 2, 20 and 30 have separate belts and have separate drive means portions to allow different movements and adjustments heretofore unknown in dough lappers and is quite adaptable for handling fragile doughs. The length of the extension and retraction movements can be varied by varying the length of the stroke of the cylinder 45 which is determined by a limit switch means 99 controlling the length of stroke of the cylinder 45. Preferably the limit switch means 99 includes two Candy Model A switches operably connected to the cylinder 45 with one controlling extension and one controlling retraction. This permits control of the length of stroke and thereby the width of the lapped doughweb as well as its position on the belt 40. Thus it is seen that the present invention provides an adjustable lapper which allows independent adjustment and operation of various portions thereof to obtain a high degree of flexibility in the lapper in a non-complicated and mechanically simple system. It is preferred that stretching and bunching be less than about 20% preferably less than about 10% and most preferably less than 5% with the latter value being what is meant by stretching and bunching being substantially prevented and gentle handling.

It is to be understood that while there has been illustrated and described certain forms of this invention it is not to be limited to the specific form or arrangement of parts herein described and shown except to the extent that such limitations are found in the claims.

What is claimed and desired to be secured by Letters Patent is:

1. A dough web feeding device comprising:
   (a) first conveying means including a first discharge end and a first belt movably mounted on said first conveying means, said first discharge end being nonreciprocating relative to the ground during operation of the dough web feeding device;
   (b) second conveying means positioned beneath said first conveying means including a second discharge end and a second belt, separate from the first belt, movably mounted on said second conveying means, said second discharge end being movable relative to said first discharge end in reciprocating motion;
   (c) third conveying means positioned beneath said second conveying means including a third discharge end and a third belt, separate from the first belt and second belt, movably mounted on said third conveying means, said third discharge end being movable relative to said first discharge end in reciprocating motion;
   (d) first drive means operably associated with said first, second and third conveying means operable for effecting movement of said first, second and third belts and reciprocating movement of said second and third discharge ends relative to one another.

2. A dough feeding device of claim 1 including:
   (a) fourth conveying means having a fourth belt positioned beneath said third belt and operable to receive a dough web from third conveying means with said fourth and third conveying means cooperating to provide a lapped dough web on said fourth belt.

3. A dough feeding device as set forth in claim 2 wherein:
   (a) said first, second and third belts are in superposed relationship and are in generally longitudinal alignment, and
   (b) said first drive means being operable to substantially prevent stretching and bunching of a dough web conveyed by said first, second and third conveying means.

4. A dough feeding device as set forth in claim 1, 2 or 3 wherein:
   (a) the drive speed of each of the second and third belts plus the respective speed of the second and third discharge ends is each substantially equal to the speed of the first belt on both the forward and rearward movement of the second and third discharge ends.

5. A dough feeding device as set forth in claim 4 wherein said first drive means includes:
   (a) second drive means operably connected to said first belt to effect movement thereof and
   (b) third drive means associated with said second drive means and operably connected to said second and third conveying means effecting movement of said second and third belts and reciprocating movement of said second and third discharge ends.

6. A dough feeding apparatus as set forth in claim 5 wherein said second and third drive means are mounted on support means and said third drive means includes:
   (a) first and second overrunning clutch means operably connected to said second and third belts respectively effecting movement of said second and third belts during reciprocating movement of the second and third discharge ends with said second belt having a first speed during a first direction of reciprocation and a second speed during a second direction of reciprocation and said third belt having a third speed during a first direction of reciprocation and a fourth speed during a second direction of reciprocation.

7. A dough feeding apparatus as set forth in claim 6 wherein:
(a) said first and second speeds are substantially equal and the magnitude of the third speed is substantially twice said first and second speeds and the fourth speed is substantially 0, and
(b) the ratio of the speeds of the first, second and third discharge ends on extension and retraction is substantially 0:1:2.

* * * * *